United States Patent
Gates

[15] 3,643,366
[45] Feb. 22, 1972

[54] LURE DISLODGING AND RETRIEVING DEVICE

[72] Inventor: Eugene R. Gates, 941 S. Gertrude Street, Stockton, Calif. 95205

[22] Filed: Sept. 14, 1970

[21] Appl. No.: 71,651

[52] U.S. Cl. ............................................................43/17.2
[51] Int. Cl. .............................................................A01k 97/00
[58] Field of Search ..............................................43/17.2, 5

[56] References Cited

UNITED STATES PATENTS

| | | |
|---|---|---|
| 2,443,061 | 6/1948 | Waltamath ............................43/17.2 |
| 2,553,173 | 5/1951 | Consolo et al. .......................43/17.2 |
| 2,609,632 | 9/1952 | Davis......................................43/17.2 |
| 2,764,833 | 10/1956 | Clark......................................43/17.2 |
| 2,807,905 | 10/1957 | Ford.......................................43/17.2 |
| 3,092,925 | 6/1963 | Ho et al. ................................43/5 |
| 3,144,728 | 8/1964 | Stevens..................................43/17.2 |

Primary Examiner—Samuel Koren
Assistant Examiner—G. M. Yahwak
Attorney—Clarence A. O'Brien and Harvey B. Jacobson

[57] ABSTRACT

A fish lure loosening and dislodging retriever comprising a weight provided at its upper end with a first eye to which a lifting line is connected and a second eye fixed on one side below but adjacent the upper end and which embodies a pigtail coil and is detachably and slidingly connectable with the fishing line. This weight attaching eye is rigid and constitutes a lure knocker and is manipulable in a manner to hammer and, as is ordinarily the case, free the snagged lure. If this step fails, the clawlike grappling hooks can be brought into play in a manner to lift the log or brush and render the lure accessible for removal by hand.

8 Claims, 4 Drawing Figures

PATENTED FEB 22 1972 3,643,366

Eugene R. Gates
INVENTOR

BY Clarence A. O'Brien
and Harvey B. Jacobson
Attorneys

LURE DISLODGING AND RETRIEVING DEVICE

This invention relates to a fish lure retriever which is such in construction and adaptability that it lends itself to reliable and gratifying use and, as repeated trial and error service has shown, well serves the dislodging and retrieving purposes for which it has been constructed.

It is common knowledge that all anglers and fishermen sooner or later encounter submerged logs, tree branches and other miscellaneous obstacles on which the hook or hooks of favorite and sometimes expensive lures are snagged and are difficult to bring back to the surface for subsequent use. Recognizing the loss of time and lures, many and varied styles and types of lure retrievers have been devised and used often without success, depending on the special retrieving difficulties which are encountered. For background and state of the art purposes, the reader may, if so desired, refer to the fish lure and hook retriever disclosed in a patent to M. D. Consolo et al., 2,553,173. A seemingly slightly more pertinent and informative lure retriever is revealed in a patent to Raymond E. Waltamath, 2,443,061.

An object of the present invention is to advance this line of endeavor through the medium of what is believed to be a structurally and functionally improved lure dislodging and retrieving device.

Briefly, the herein disclosed lure dislodging and retrieving device comprises an elongated cylindrical weight of predetermined and satisfactorily usable heaviness wherein a screw eye or the like is mounted axially on the upper end to accommodate the lure attachable end of a flexible manually manipulatable lifting and lowering line. This line when attached to the securing eye permits the weight to be dangled and swished up and down in the water which is being fished in keeping with the retrieval requirements at hand. A plurality of clawlike hooks are mounted on the lower end and provide grappling means wherein the free pointed ends of the bill portions of the hooks project beyond the peripheral surface of the weight in readiness to be engaged with brush and miscellaneous debris in which the desired lure has become tangled or snagged, as the case may be. Of special significance is the rigid retriever attaching means which is fixed on one side of the upper end portion just below the locale of the upper end, this means being detachably and slidingly connectable to the fishing line and projecting beyond the peripheral surface in a manner to serve as a lure pounding and releasing knocker.

In carrying out the principles of the invention the weight-attaching eye takes the form of a simple pigtail coil which lends itself to ready attachment to and detachment from the descending fishing line. The individual circumferentially spaced hooks are unique in that the pointed bill and shank portions are made of bendable malleable material so that if the snag is too heavy for lifting, that is by way of the hooks, the free end portions straighten out lengthwise and disengage themselves from the snag but can be bent back and resorted to desired curvate shape for subsequent use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
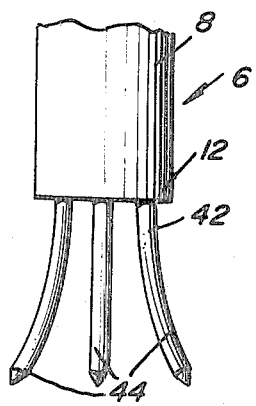

And FIG. 4 is a fragmentary elevational view the purpose of which is to show how the malleable hook and shank portions can straighten themselves out for release from the submerged obstacle, that is, when it is too heavy to bring up to the surface of the water being fished.

With reference now to the views of the drawing, the aforementioned weight is denoted by the numeral 6 and is cylindrical in cross section from end to end to provide a body 8 of predetermined material and heaviness. The upper flat or planar end of the weight is denoted at 10 and the lower spaced parallel planar end is denoted at 12. The axial central portion of the upper end is provided with a screw-threaded socket 14 to accommodate the screw-threaded shank of a first screw eye 16. The numeral 18 provides a locknut which secures the eye 16 in its intended position. This eye is designed and adapted to accommodate the lower end 20 of a suitably stout lifting and lowering line 22.

Figure 1:
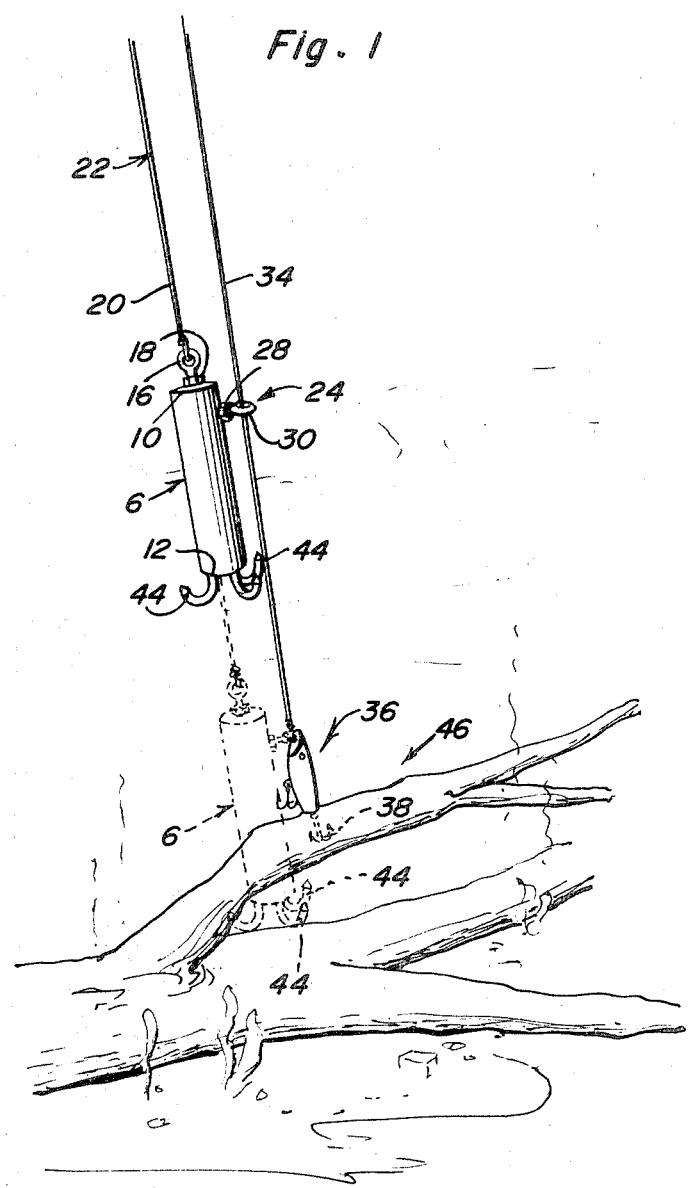
FIG. 1 is a view showing a hook-equipped lure hung or snagged on a limb of a log and showing in full lines and phantom lines the novel lure dislodging and retrieving device, how it is constructed and hot it is slidingly hitched to the fishing line to function as a knocker and loosening device for the lure.

The second screw eye is denoted, generally stated, by the numeral 24 and it comprises a screw-threaded shank 26 which is screwed into a socket provided therefor in one side of the upper end portion of the weight. The numeral 28 provides a locknut. The eye in this instance is in the form of a pigtail coil 30 which has a laterally offset free end portion 32. This construction permits ready attachment of the attaching eye 24 to the fishing line 34. As shown in FIG. 1 the fishing line is attached at its lower end to a lure 36 having one or more swingably and swivelly mounted fishhooks 38 thereon. It will be noted that this second-named attaching eye 24 is disposed at right angles to the lengthwise axis of the weight and it is in a locale which is just below the level of the upper end 10. In practice this screw eye 24 serves not only as a means for attaching and detaching the weight, it constitutes a hammerlike knocker which comes into play in the manner shown in phantom lines in FIG. 1.

Figure 3:
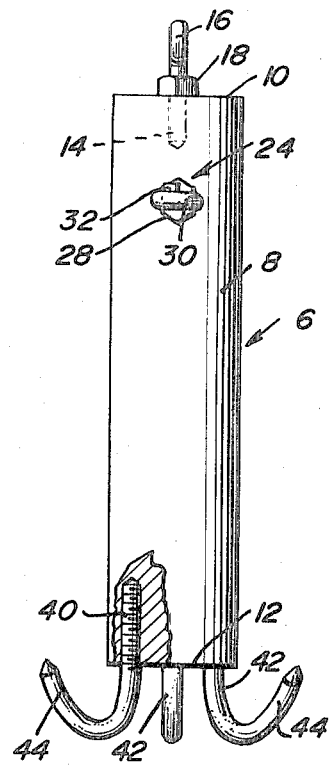
FIG. 3 is a view on a suitably enlarged scale in side elevation and with a portion of the bottom broken away to show one manner of mounting the several claw-forming hooks.
Figure 2:
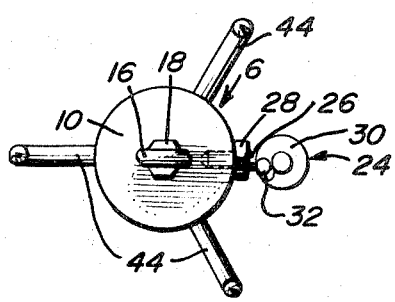
FIG. 2 is a top plan view on a suitably enlarged scale with the fishing line and lowering or handling line omitted.

With more specific reference now to the lower flat or planar end 12 of the weight it will be noted that several duplicate hooks are attached to and carried by the lure end. These hooks are spaced circumferentially and equidistant from each other. Each hook is substantially J-shaped and has a screw-threaded shank portion 40 which is screwed into a screw-threaded socket provided therefor as shown in FIG. 3. A portion 42 of the shank projects beyond the surface 12 where it is junctionally connected with the outwardly curved pointed bill 44. These equally spaced pointed bills coact in providing a clawlike grapple. It is to be pointed out that these hooks, that is the shank portions, are not rigid but are made of bendable malleable material. The normal or natural shape of the hooks is that shown in FIGS. 1, 2 and 3. Experience has shown that if the user finds it difficult to pound and free the lure 36 from the tree structure 46 (FIG. 1) he can then resort to the use of the several hooks constituting the clawlike grapple. Experience has shown that it is quite possible in many instances to use these hooks to lift the brush or other debris to the surface and in that manner have access to the parts thereof and to free the hooks or the lure 36 in a seemingly obvious manner. If the log or other brush is too heavy to be lifted by the hooks, the malleable shank portions will yield, straighten out and free the retriever. Because of the bendable nature of the hooks they can be restored to their original hook-shaped form whenever and wherever necessary or desired.

It is believed to be evident from FIG. 1 that in using the device the split attaching eye 24 is hooked on the fishing line 30 and the weighted device is lowered by way of the attached lifting and lowering line 22. The line 22 should then be lifted and lowered to cause the rigid attaching eye 24 to function as a knocker and to hammer the lure 36 loose by lifting and dropping the weight 6 in whatever manner desired.

Experience has also shown that the clawlike hook means on the lower end of the weight can be used, if desired, as a small anchor. It can also be used to retrieve a rod and reel that may have been lost overboard.

As already stated, the attaching and retaining eye means 24 constitutes a satisfactory knocker and in most instances when used in the manner illustrated in FIG. 1 it is possible to retrieve the hook-equipped lure. If this procedural step fails the three hooks of the claw means can be used to hook the snag and bring the same to the surface and then detach the lure by hand.

It is emphasized that the locale or positioning of the means 24 on one side and near the top 10 has been found to be the ideal position when said means is employed as a knocker.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing lure dislodging and retrieving device comprising, in combination, an elongated weight having upper and lower ends, means mounted on the upper end of said weight to which the lower end of a manually manipulatable flexible lifting and lowering line is connected and through the medium of which said weight can be dangled and alternately raised and lowered in the water which is being fished, a plurality of clawlike grappling hooks mounted on the lower end of said weight and having free pointed bill portions, said hooks being circumferentially spaced and adapted to catch hold of and lift and bring liftable debris to the water's surface for discretionary handling and disposition, and rigid retriever attaching means fixed on one side of the upper end portion only of said weight, said last-mentioned means being detachably and slidingly connectable to the snagged fishing line and projecting beyond the peripheral surface in a manner to serve as a lure pounding and loosening member.

2. The lure dislodging and retrieving device defined in and according to claim 1, and wherein said lure pounding and loosening member comprises an eye which is located proximal to but just below the level of said upper end and which projects to a point beyond said peripheral surface that it can be successfully lined up with a snagged lure, intermittently hammered against the same, aided by the heaviness of the weight, in a manner to dislodge and free the lure for retrieval.

3. The lure dislodging and retrieving device defined in and according to claim 2, and wherein said eye comprises a screw eye having a screw-threaded shank screwed into a coacting nut fixed on a predetermined peripheral surface portion of the weight and projecting radially beyond said surface portion, the eye proper comprising a pigtail coil which is capable of being detachably sliding hitched for use to a selected portion of the fishing line.

4. The lure dislodging and retrieving device defined in and according to claim 1, and wherein said hooks are free of connection with each other.

5. The lure dislodging and retrieving device defined in and according to claim 1, and wherein said hooks are free of connection with each other, each of said hooks being made of bendable malleable material so that if the snag is too heavy for lifting by said hooks, the latter can straighten out lengthwise and disengage from the snag but can be bent back and restored to curvate shape for subsequent use.

6. A dislodging and retrieving device for a snagged lure comprising an elongated weight cylindrical in cross section and of uniform cross section from end to end and having planar upper and lower ends, said upper end being axially provided with a screw-threaded socket, a first screw eye having a threaded shank screwed into said socket and provided with a locknut engaging the coacting end of the weight, said weight being provided on one side adjacent said upper end with a screw-threaded socket at right angles to the first-named socket, a second screw eye having a screw-threaded shank screwed into said second socket and held therein by a locknut carried by the shank of the screw and abutting a surface of the weight, the eye of said last-mentioned screw being split and provided with an offset terminal end providing a pigtaillike coil, said coil being adapted for ready attachment to and detachment from a fishing line, and means mounted on the lower end of said weight for hooking a snagged lure.

7. The dislodging and retrieving device defined in and according to claim 6 and, in combination, said last-mentioned means comprising clawlike means carried by the lower end of said weight, said means comprising a plurality of like hooks having a shank portion secured to the weight at equidistant circumferentially spaced points and having pointed hook portions projecting beyond the peripheral surface of said weight.

8. The dislodging and retrieving device defined in and according to claim 6 and, in combination, said last-mentioned means comprising clawlike means carried by the lower end of said weight, said means comprising of a plurality of like hooks having a shank portion secured to the weight at equidistant circumferentially spaced points and having pointed hook portions projecting beyond the peripheral surface of said weight, said hooks being of malleable metal and capable of straightening out when a predetermined load is imposed thereon and being manually bendable to resume a predetermined shape whenever necessary or desired.

* * * * *